United States Patent
Remla et al.

(10) Patent No.: US 10,033,523 B1
(45) Date of Patent: Jul. 24, 2018

(54) CIRCUIT FOR AND METHOD OF MEASURING LATENCY IN AN INTEGRATED CIRCUIT

(71) Applicant: Xilinx, Inc., San Jose, CA (US)

(72) Inventors: Riyas Noorudeen Remla, Singapore (SG); Warren E. Cory, Redwood City, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/676,667

(22) Filed: Aug. 14, 2017

(51) Int. Cl.
*H04L 7/00* (2006.01)
*H04L 7/04* (2006.01)

(52) U.S. Cl.
CPC .......... *H04L 7/0091* (2013.01); *H04L 7/0037* (2013.01); *H04L 7/04* (2013.01); *H04L 7/048* (2013.01)

(58) Field of Classification Search
CPC ........... G06F 13/161; G11C 2207/2272; H04L 43/0852; H04L 43/0858; H04L 43/0864
USPC ........................................... 375/371; 365/194
See application file for complete search history.

(56) References Cited

U.S. PATENT DOCUMENTS

| | | |
|---|---|---|
| 7,071,679 B1 | 7/2006 | Sabih et al. |
| 7,301,327 B1 | 11/2007 | Sabih et al. |
| 7,420,384 B1 | 9/2008 | Sabih et al. |
| 7,594,048 B1 | 9/2009 | Edwards et al. |
| 7,965,801 B1 | 6/2011 | O'Reilly et al. |
| 8,386,828 B1 | 2/2013 | Ambatipudi et al. |
| 8,654,823 B1 | 2/2014 | Zhu et al. |
| 8,917,803 B1 | 12/2014 | Asuncion et al. |
| 8,928,334 B1 | 1/2015 | Raj et al. |
| 8,971,468 B1 | 3/2015 | Novellini |
| 8,995,514 B1 | 3/2015 | Asuncion et al. |
| 9,323,457 B2 | 4/2016 | Blott et al. |
| 9,331,724 B2 | 5/2016 | Novellini et al. |
| 9,411,701 B2 | 8/2016 | Azad |
| 9,497,050 B2 | 11/2016 | Kain |
| 9,519,486 B1 | 12/2016 | Blott et al. |
| 2005/0102545 A1* | 5/2005 | Clavequin ................. G06F 1/10 713/401 |
| 2006/0161647 A1* | 7/2006 | Wojtkiewicz ....... H04L 43/0852 709/224 |
| 2009/0006881 A1* | 1/2009 | Ogura ...................... G11C 7/02 713/500 |
| 2014/0016222 A1* | 1/2014 | Ionescu .................... G11B 5/09 360/46 |

* cited by examiner

*Primary Examiner* — Kevin Kim
(74) *Attorney, Agent, or Firm* — John J. King

(57) ABSTRACT

A circuit for measuring latency in an integrated circuit device is described. The circuit comprises a transmitter circuit having signal generator configured to generate a test signal having a marker for determining a latency in a path associated with the integrated circuit device; and a latency calculation circuit coupled to the signal generator and having a latency adjustment circuit and a unit interval (UI) adjustment circuit; wherein the latency calculation circuit generates a latency value (LATENCY) based upon a latency count from the latency adjustment circuit and a UI adjustment from the UI adjustment circuit.

20 Claims, 7 Drawing Sheets

CIRCUIT FOR AND METHOD OF MEASURING LATENCY IN AN INTEGRATED CIRCUIT

TECHNICAL FIELD

The present invention relates generally to circuit devices, and in particular, to a circuit for and method of measuring latency in an integrated circuit.

BACKGROUND

Like area and power, latency is an important design parameter, accurately measuring real time latency is critical to low latency applications. However, conventional techniques to measure latency have disadvantages. According to one conventional technique, a difference between read and write pointers is averaged. While it is assumed that latency through the data path is fixed, and only variable is for first-in, first-out (FIFO) blocks and Gearbox FIFO blocks, this technique calculates the latency through FIFOs as an average of difference between read and write pointers over a period of time. This average latency is added with the fixed latency of the path. However, such latency measurements are not accurate, as there are many unknown latency components in a data path other than FIFOs.

According to another technique which is based upon a fixed marker latency measurement, a fixed latency marker is sent to a transmit (TX) data path. A counter is incremented until the data is received back at the receiver. However, according to this technique, the latency is accurate only up to a number of cycles. This technique is also complicated by data recovery problems in clock and data recovery (CDR). Further, differences in data alignment in the receiver versus the transmitter complicate the recognition of the latency marker and calculation of latency. Finally, different phases of the transmitter and receiver clocks can also reduce the accuracy of the latency measurement.

Accordingly, methods and circuits that more accurately measure latency in an integrated circuit are beneficial.

SUMMARY

A circuit for measuring latency in an integrated circuit device is disclosed. The circuit comprises a transmitter having signal generator configured to generate a test signal having a marker for determining the latency in a path associated with the integrated circuit device; and a latency calculation circuit coupled to the signal generator and having a latency adjustment circuit and a unit interval (UI) adjustment circuit; wherein the latency calculation circuit generates a latency value based upon a latency count from the latency adjustment circuit and a UI adjustment from the UI adjustment circuit.

Another circuit for measuring latency in an integrated circuit device comprises a transmitter having signal generator configured to generate a test signal having a marker for determining the latency in a path associated with the integrated circuit device; and a latency calculation circuit coupled to the signal generator and having a latency adjustment circuit and a skew measurement circuit; wherein the receiver generates a latency value based upon a latency count from the latency adjustment circuit and a clock skew from the skew measurement circuit.

A method of measuring latency in an integrated circuit device is also disclosed. The method comprises transmitting a test signal having a marker for determining the latency in a path in the integrated circuit device; receiving the test signal having a marker at a receiver; determining a latency count associated with the transmission of the test signal from the transmitter to the receiver as a course latency value; determining a fine adjustment associated with the transmission of the test signal from the transmitter to the receiver; and generating a latency value based upon the latency count and the fine adjustment.

Other features will be recognized from consideration of the Detailed Description and the Claims, which follow.

DETAILED DESCRIPTION

Figure 1:
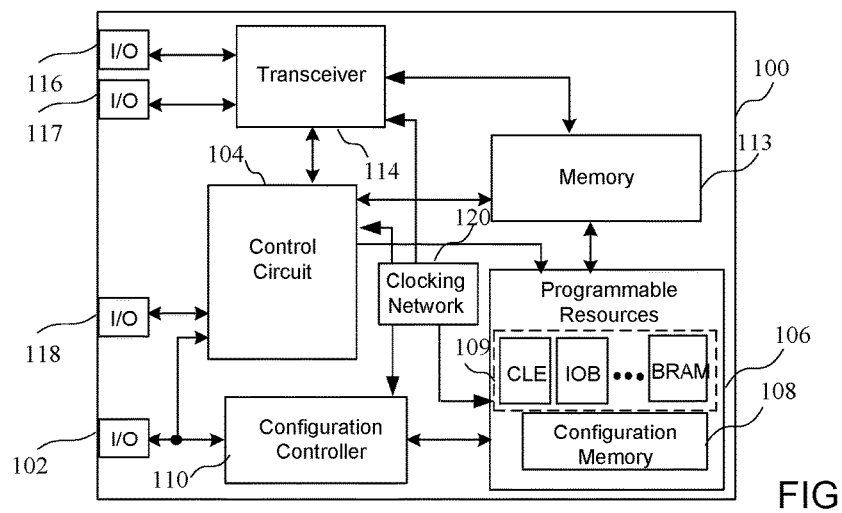
FIG. 1 is a block diagram of an integrated circuit device having a transceiver for transmitting and receiving data.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods set forth below are related to real time latency measurement for a physical interface (PHY) including a physical coding sublayer (PCS) and a physical medium attachment (PMA). Because latency is an important design parameter, measuring real time latency accurately is critical to low latency applications. The circuits and methods use error injection and detection methods, such as pseudorandom binary sequence (PRBS) error injection and detection methods, to calculate a round-trip latency. Injected PRBS errors act as the marker for measuring latency accurately, and provide accuracy up to 1 unit interval (UI), even accounting for combinational delay.

A PRBS error pattern, such as a single bit error or burst error, functions as a latency marker, resulting in improved accuracy of the latency measurement compared to conventional techniques. The circuits and methods set forth below identify three components of the latency measurement, including latency count, UI adjustment, and clock skew. While the first of these provides only a cycle count and is therefore not very accurate, the other two components make the measurement more accurate. Because the error detection according to the circuits and methods set forth below is to the bit level, it is possible to determine the latency up to a fraction of a UI. An additional aspect of the circuits and methods takes the clock skew between TX clock and RX clock into account for additional accuracy in the latency calculation. The latency detection can be run together with an eye scan operation, which also uses a PRBS circuit. By reusing the PRBS data path component that exists for other purposes, there no extra cost in accurately calculating latency in a data path. That is, a PRBS checker detects a latency marker without need for special logic to recognize "latency marker" with arbitrary alignment. According to some implementations, different data paths or different stages of a data path, such as FIFOs and asynchronous gearboxes, can be selected for latency measurement.

Turning first to FIG. 1, a block diagram of an integrated circuit device 100 having a transceiver for transmitting and receiving data is shown. In particular, an input/output port 102 is coupled to a control circuit 104 that controls programmable resources 106 having configurable logic elements 109. Configuration data may be provided to the configuration memory 108 by a configuration controller 110. The configuration data enables the operation of the programmable resources 106. A memory 113 may be coupled to the control circuit 104 and the programmable resources 106. A transceiver circuit 114 may be coupled to the control circuit 104, programmable resources 106 and the memory 113, and may receive signals at the integrated circuit by way of I/O ports 116 and 117. Other I/O ports may be coupled to circuits of the integrated circuit device, such as I/O port 118 that is coupled to the control circuit 104 as shown. A clocking network 120 is coupled to various elements of the circuit of FIG. 1. The circuits and methods as described in more detail below could be implemented to measure the latency of data transmitted by the transceiver of FIG. 1, for example.

Figure 2:
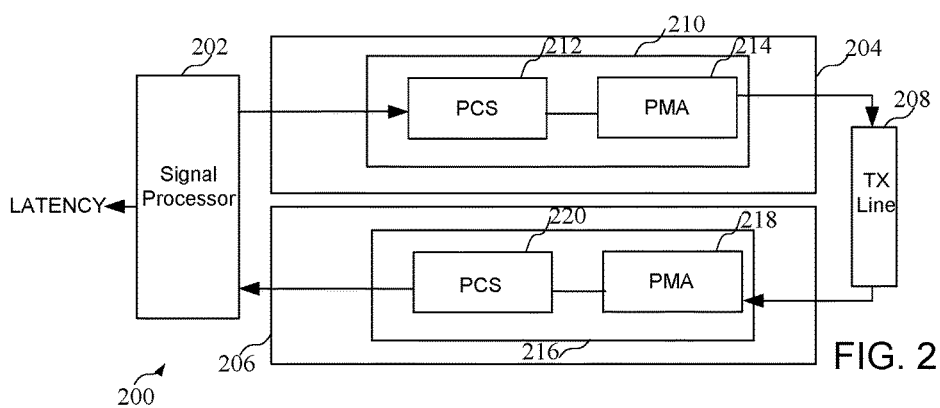
FIG. 2 is a block diagram of a circuit for measuring latency in an integrated circuit device.

Turning now to FIG. 2, a block diagram of a circuit 200 for measuring latency in an integrated circuit device is shown. As shown in FIG. 2, a signal processor 202 is coupled to a first data path 204 and a second data path 206, which are coupled by a transmission line 208. As will be described in more detail below, the transmission line 208 could be internal to an integrated circuit device, or external to the integrated circuit device. According to some implementations, the data path 204 may comprise a PHY 210 including a PCS 212 and PMA 214. Similarly, the data path 206 may comprise a PHY 216 including a PCS 218 and PMA 220. As will be described in more detail in reference to FIG. 3, the signal processor 202 may use error injection and detection methods, such as pseudorandom binary sequence (PRBS) error injection and detection methods, to calculate the round-trip latency. The injected PRBS errors act as the marker for measuring latency accurately, and provide accuracy up to 1 unit interval (UI), even accounting for combinational delay.

Figure 3:
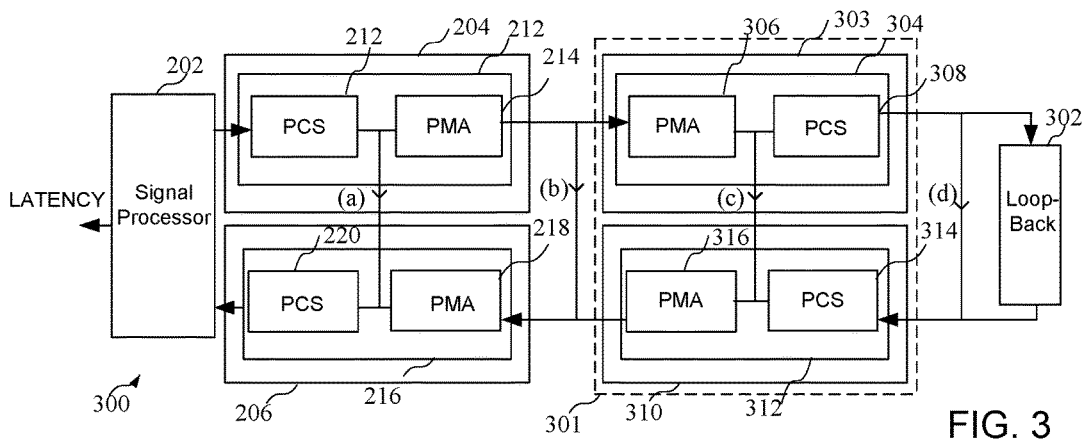
FIG. 3 is another block diagram of a circuit for measuring latency in an integrated circuit device.

Turning now to FIG. 3, another block diagram of a circuit 300 for measuring latency in an integrated circuit device is shown. The circuit of FIG. 3 includes an additional block 301, coupled to a loopback circuit 302 and enabling the calculation of latency in different paths. The loopback circuit 302 may be a higher level protocol layer which may be a capable of a loopback operation. The block 301 comprises a first data path 303 comprising a PHY 304 having a PMA 306 coupled to a PCS 308, and a second data path 310 comprising a PHY 312 having a PCS 314 and a PMA 316, where path (a) can be selected to calculate the latency associated with the PCS, path (b) can be selected to show the latency associated with the PMA by subtracting the latency associated with the PCS with the latency of the PMA. Similarly, the latency associated with the second block can be determined by determining the difference in latency between path (c) and path (b) and the difference in latency between the path (d) and path (c). It should be noted that, while the specific latency calculations are provided for the physical interface, a similar latency calculation could be performed for upper OSI layer blocks such as for MAC.

Figure 4:
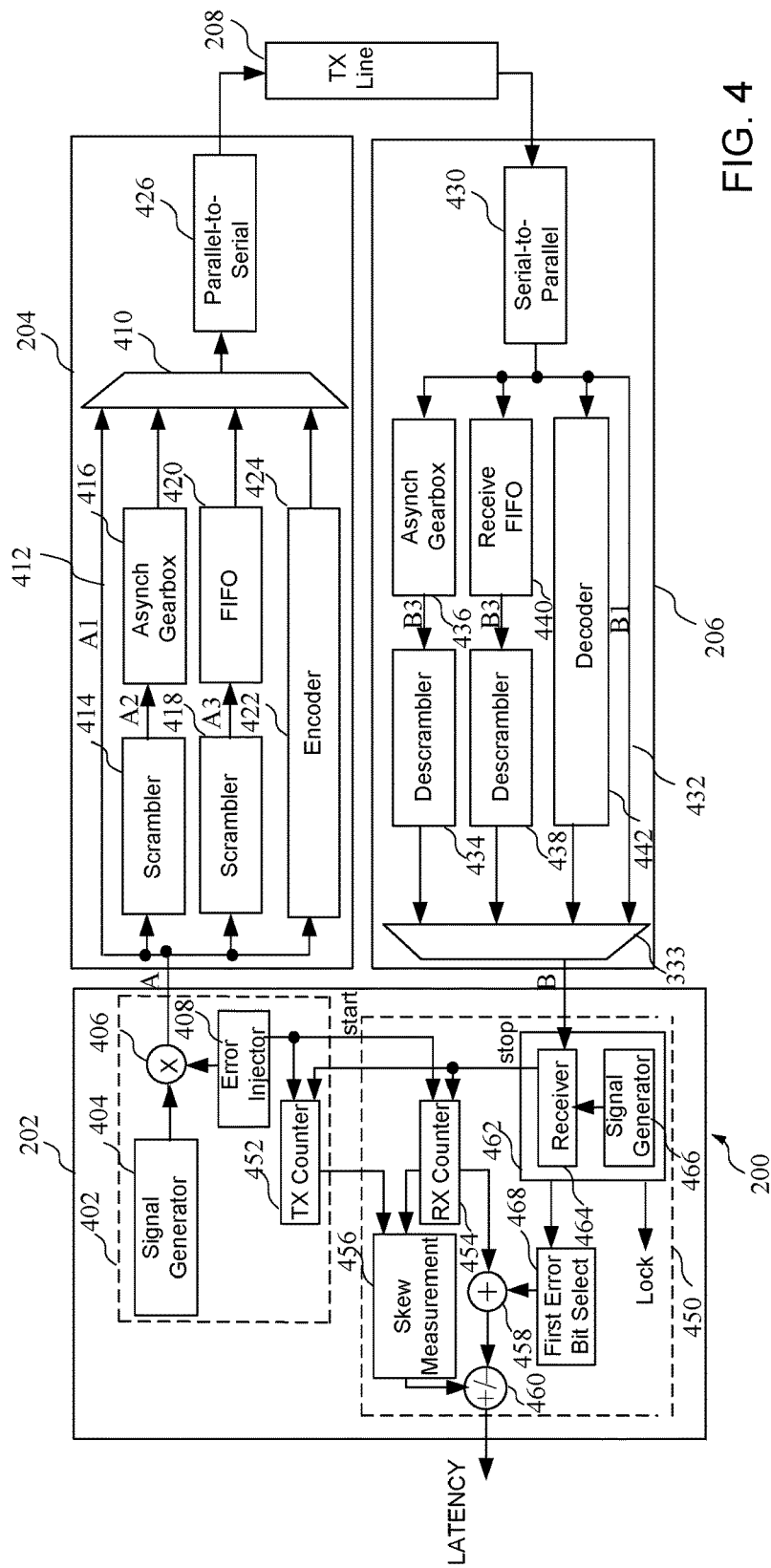
FIG. 4 is another block diagram of a circuit for measuring latency in an integrated circuit device.

Turning now to FIG. 4, another block diagram of a circuit for measuring latency in an integrated circuit device is shown. The signal processor 202 comprises a transmitter circuit 402 having a signal generator 404 coupled to a combiner circuit 406 adapted to receive an error signal from an error injector 408. As will be described in more detail below, an error signal, also known as a marker, is injected into a signal generated by the signal generator, where the error signal provides a marker that can be detected by a receiver. An output of the transmitter circuit 402 is coupled to a plurality of data paths that are selectable by a multiplexer 410, including a first path transmitting data A1 that enables bypassing PCS blocks. The first data path bypasses all PCS blocks to obtain a PMA latency value. A second data path comprises a scrambler 414 generating data A2 that is coupled to an asynchronous gearbox 416, which may transfer 64B66B data for example. A third data path comprises a scrambler 418 generating data A3 that is coupled to a FIFO 420. Finally, a fourth path has an encoder 422 for transmitting data to the multiplexer 410.

The second data path 206, which is a receiver path, comprises a serial-to-parallel converter circuit 430 that is coupled to a plurality of receive data paths, including a receive path 432 transmitting data B1 to a multiplexer 433. A second receiver path comprises an asynchronous gearbox circuit 436 that provides received signal B3 to a descrambler 434. A third data path comprises a receive FIFO 440 and a descrambler 438. Finally, a decoder 442 of a fourth receive data path provides data to the multiplexer 433.

A latency calculation circuit 450 of the signal processor 202, which may be a part of a receiver circuit as shown in FIG. 4 or may be separate from the receiver circuit but rely on elements of a receiver circuit for example, comprises a transmitter counter 452 and a receiver counter 454, each of which is configured to receive a start signal from transmitter circuit. The calculation of a latency as described below may be performed in any circuit of an integrated circuit, such as a processor for example, or external to the integrated circuit. Outputs of the transmitter counter and the receiver counter are provided to a skew measurement circuit 456, which will be described in more detail in reference to FIG. 5. An adder 458 and an adder/subtractor 460 are used to generate a latency value at an output of the adder/subtractor 460, based at least upon a latency count and a UI adjustment. A receiver block 462 comprises a receiver circuit 464 configured to receive the output of multiplexer 433. A signal generator 466 is coupled to the receiver to provide a generated signal, such as generated PRBS signal. A first error bit selector 468 is coupled to the output of the receiver block 462, an output of which is coupled to the adder 458. The first error bit select circuit 468 is used to detect the first error bit associated with a marker to enable the determination of a UI adjustment, as will be described in more detail in reference to FIG. 7.

According to the implementation of FIG. 4, a sample PCS data path that supports four different protocols (i.e. 10GigEthernet, CPRI, PCIe, and Bypass) is shown. Normally, these data paths can also be configured to run on different data widths such as 66, 33, 64, 32, 20, 16, 40, and 80 bit data widths based on data rates. A PRBS Generator may be placed before a scrambler to obtain maximum coverage on data path for latency calculation. TX and RX data path pairs which are suitable for latency measurements include (A, B), (A1, B1), (A2, B2) and (A3, B3) as shown in FIG. 4. According to one implementation, PRBS generators are connected to A, A1, A2, and A3 locations of transmit data path and PRBS receiver logic are connected to B, B1, B2 and B3 locations of receive data path. While specific examples of data widths are provided, it should be noted that the circuits could be implemented with any type of data with and any PRBS polynomial. The circuits also could be implemented using any serial line encoding schemes, such as non-return to zero (NRZ) or any pulse amplitude modulation (PAM) protocol.

The PRBS receiver and transmitter are configured to operate on same PRBS polynomial. In order to find the latency, each data path is selected as a pair and generates a PRBS pattern (i.e. any polynomial) for the selected data width, where a PRBS error pattern is used as a latency marker. While a PRBS signal generator is shown by way of example, it should be noted the circuit of FIG. 4 could implement a signal generator other than a PRBS signal generator, and that any pattern that a transmitter can corrupt and a receiver can check for errors, including for example a simple square wave, could be used. By way of example, a transmitter can corrupt a square wave at a particular point, and a receiver can detect the distortion. However, a PRBS polynomial is beneficial because many systems or testers have PRBS circuits built-in already to test channel quality; and there is no need for a receiver PRBS circuit to determine the orientation of serial data within the parallel data path before it can detect errors. The circuits and methods implement counters that are used to measure the entire data path, and determine the clock skew between the counters. Determining clock skew in this way, combined with a latency count and a UI adjustment, gives an accurate latency for the entire data path, including various combinational delays throughout the data path that are not covered by conventional techniques applied locally to a FIFO.

Differences in data alignment in the receiver versus the transmitter complicate recognition of the latency marker and calculation of latency. The alignment of serial data within the receiver data path may not match the alignment in the transmitter. Therefore, although the transmitter may inject an error in a fixed location (e.g. the LSB), there is no guarantee the error will be located in the LSB in the receiver data path. Depending on how the data pattern and marker are defined, it could be difficult to determine where within a data word an error may occur or what the error will look like. For PRBS, the error is easily located as a consequence of the PRBS calculation, without regard to data alignment. A difference in data alignment between the receiver and the transmitter must be accounted for in an accurate calculation of latency, and the UI Adjustment component covers this difference.

Further, a simple pattern that remains at 0 except for a pulse to 1 (the marker) could not be properly received by CDR (clock and data recovery), which requires frequent signal transitions to maintain good data reception. Therefore, a more complicated pattern is required, which complicates the problem of defining a marker and detecting the marker. The benefits of implementing PRBS to determine latency are that it is good for CDR, and a PRBS checker easily detects the marker without regard to data alignment. The circuits and methods therefore provide a beneficial choice of marker to determine latency in a data path. While components for adding or subtracting values to generate a more accurate latency measure may show adding a UI adjustment to a course latency measurement, and then adding or subtracting a skew value (depending upon whether transmitter clock leads or lags the receiver clock), the determined clock skew could be added or subtracted from the coarse latency measurement, the result of which would be added to the UI adjustment. It should be noted that it may in fact be possible to combine components in a single measurement. For example, a transmitter sets TX counter to 0 when it injects the latency marker. The receiver sets the RX counter to 0 when it detects the latency marker. A skew measurement circuit determines the skew between the two counters, a very accurate measurement that can be many cycles big (i.e. approximately the size of the latency in cycles) rather than being a small number of cycles or even a fractional cycle (as would be expected if both counters are set to 0 at approximately the same time). The measured skew would be a combination of "latency count" and skew in a single measurement.

Figure 5:
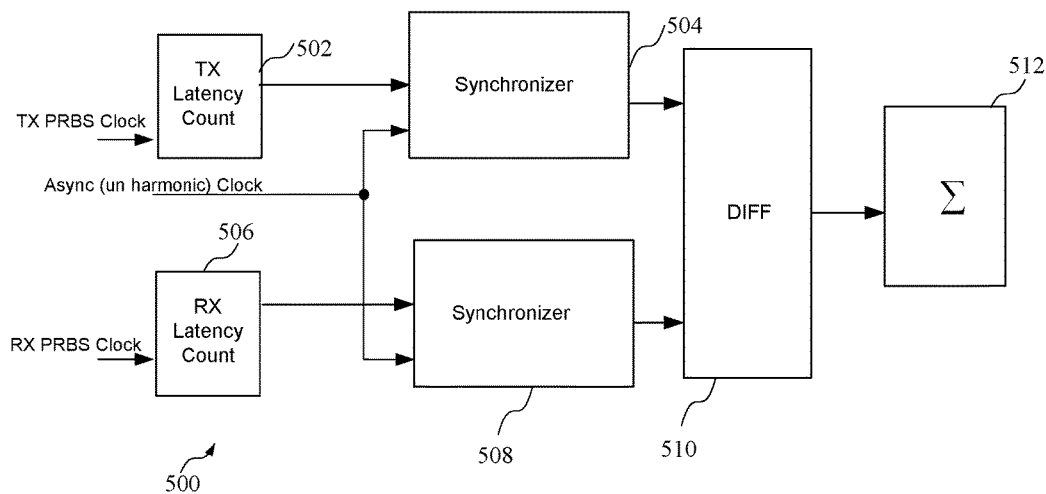
FIG. 5 is a block diagram of a skew measurement circuit that could be implemented in the circuit of FIG. 3.

Turning now to FIG. 5, a block diagram of a clock skew measurement circuit 400 that could be implemented in the circuit of FIG. 4 is shown. The clock skew measurement circuit 400 comprises a transmit latency count circuit 502 coupled to receive a transmitter clock signal, shown here by way of example as a TX PRBS clock signal, an output of which is coupled to a synchronizer circuit 504. The clock skew measurement circuit 500 also comprises a receiver latency count circuit 506 coupled to receive a receiver clock signal, shown here by way of example as a RX PRBS clock signal, an output of which is coupled to a synchronizer circuit 508. A differential circuit 510 is coupled to the outputs of the synchronizer 504 and the synchronizer 508, an output of which is coupled a summing circuit 512.

Figure 7:
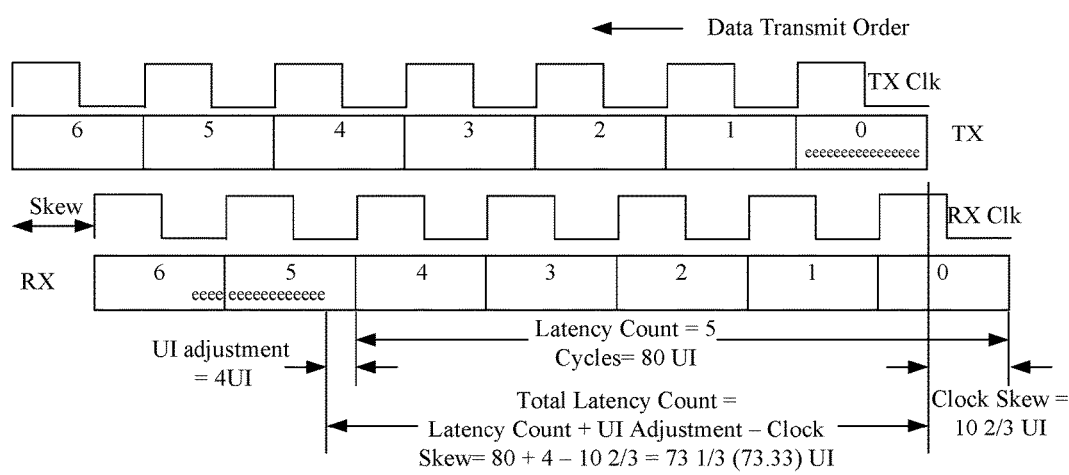
FIG. 7 is a timing diagram showing transmitted data and received data according to an exemplary data transmission.

It should be noted that the skew measurement circuit of FIG. 5 requires the counters to run for a long period of time (e.g. thousands of cycles) for an accurate determination of skew between the counters. The uncertainty of timing between the start signals in the TX versus RX domains, and similarly for the stop signals in the TX and RX domains, must be taken into account. To address these concerns. the counters could run continuously, started at about the same time. The skew measurement could proceed over the required long period of time. The transmitter records the TX counter value when it injects the error, and the receiver records the counter value when it detects the error. The recorded TX and/or RX counter values are transmitted to the clock domain where the latency calculations occur (which could be either the TX or RX domain or even some other domain). FIG. 7 below shows calculations occurring in the RX domain. The recorded counter values are subtracted to obtain the latency count, and the skew measurement block provides the clock skew.

While some accounting is required for the skew between the TX and RX clocks, there are different ways to account for the skew. According to one implementation, separate counters are used in the TX and RX domains to record error injection (TX) and error detection (RX) times. A precise measurement of the skew between the counters adds precision to the overall measurement. For this approach, the counters may be configured to run continuously, without the use of start/stop signals. Start/stop signals could be used to cause a test to proceed, alert monitoring logic that a test is or will be in progress, or signal the end of a test; but that signal would not need to affect the counters. Alternatively, a single counter in either the TX or RX domain could be used, and the start and/or stop signals could be used to control the initiation and/or sampling of the counter. In this case, the start/stop signals could be passed between clock domains via a FIFO, for example, so that the latency of that communication does not vary. The measurement of skew between two different counters is now replaced by the precise measurement of latency through any control signal FIFOs. An additional technique for taking the clock skew between the TX clock and the RX clock into account is described in more detail below in reference to FIGS. 8 and 9.

Figure 6:
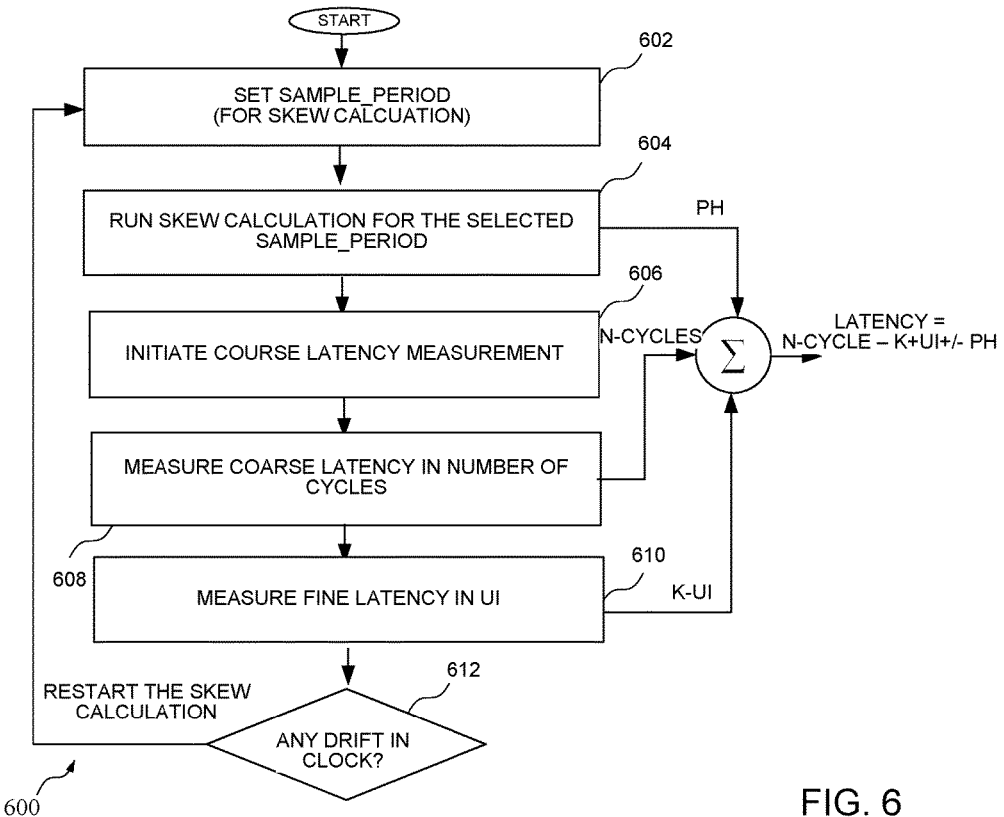
FIG. 6 is a flow chart showing a method of measuring skew in an integrated circuit device.

Turning now to FIG. 6, a flow chart shows a method of measuring latency in an integrated circuit device. After a sample period (SAMPLE_PERIOD) is set for a skew calculation at a block 602, a skew clock calculation is run for the selected sample period to generate a skew calculation PH at a block 604. A course latency measurement is initiated at a block 606 to generate a course latency measurement in cycles (e.g. N cycles) at a block 608. A fine latency measurement, representing a latency adjustment which may be a fraction of a UI for example (designated K–UI), is generated at a block 610. It may then be determined if there is any drift in the clock at a block 612. If so, the clock skew calculation is restarted at the block 602. The three components of skew (N cycles associated with a coarse latency measurement, the PH measurement associated with clock skew, and the fine latency measurement K–UI representing a latency adjustment) may be summed to determine a latency, shown here ad N-Cycle–K+UI+/–PH. While all three components could be used in the calculation, it should be noted only one of the fine latency adjustment (K–UI) or the clock skew (PH) could be summed with the coarse latency calculation to determine a more accurate latency measurement. The method of FIG. 5 could be implemented in any of the circuits of FIGS. 1-5, or other suitable circuits.

Turning now to FIG. 7, a timing diagram shows transmitted data and received data according to an exemplary data transmission having a 16-bit data width, and shows the three contributions to latency measured by the circuit of FIG. 4. The first contribution is a latency count, which could be a coarse latency measured as the difference between the TX Counter start (error injection) value and the RX Counter stop (error detection) value. To determine a latency count, TX and RX counters are cleared when an error injected into the PRBS data, and RX counter is recorded when the same pattern of errors receive in PRBS Receiver, where the counters will give the number of cycles difference.

The second component of latency is a UI adjustment, which is an adjustment implied by alignment of received latency marker, or by a variation of a latency count over multiple trials. Different methods can be used for determining the UI Adjustment. According to one implementation, a single bit error is injected and its alignment noted in the receiver. When error is recognized in the PRBS Receiver, the location of error in the word gives the actual latency in UI. That is, only a single bit error is sent, and the bit position of the detected error. For example, the bit error may be injected on bit <0> (the first transmitted bit), and it is detected in bit <k> of the received data n cycles later. This detection would indicate a latency of n cycles+k UI. While this is a fast determination, it requires extra logic in the PRBS checker to bring out the bit-select for the (first) detected error. According to another implementation, multiple bit errors (one per trial) are injected at different alignments and the variation of latency counts is noted in the receiver.

Finally, a third component of a latency count which could be determined and included in a latency measurement is clock skew. The clock skew is the measured skew between a transmitter clock and a receiver clock. The skew measurement circuit of FIG. 7 uses a non-harmonic clock randomly sampling of the TX and RX counters that will see them with the same value ⅓ of the time, with the RX counter being one higher ⅔ of the time according to the example of FIG. 7. Hence, the RX counter leads the TX counter by ⅔ of a cycle that is 10⅔ UI. The final latency value is found by subtracting the RX counter lead time from the initial latency as shown below. Latency=84–10⅔ UI=73.33 UI. If the TX counter leads the RX counter, TX counter lead time will be added to the initial latency.

More particularly, FIG. 7 illustrates the latency calculation for a 16-bit data path. The numbers indicate the TX and RX counter values, with time proceeding from right to left. Symbol 'e' represents injected errors, transmitted from every bit position (one bit per trial) during TX counter value 0, and received during RX counter values 5 and 6. The receiver receives 12 bit errors during cycle 5 and 4 bit errors during cycle 6, for a computed latency of 5¼ cycles, or 84 UI for the 16-bit data width. Alternatively, the bit error injected at bit position <0> is received in bit position <4> of cycle 5, again indicating a latency of 5¼ cycles. According to another implementation, the entire PRBS word for TX count 0 could be inverted (i.e. every bit in error) and the number of bit errors received per cycle noted in the receiver. If all the 'e' bits are inverted in the PRBS Generator, then 12 bit errors are received for RX count 5 and 4 bit errors are received for RX count in this example. As above, this results in a calculated UI Adjustment of 4 UI.

It should be noted that there is flexibility in the selection of a clock domain to perform the latency calculation. The calculation could be performed using the TX clock, RX clock, un-harmonic clock used for measuring skew between counters or control signal transmission time, or a completely independent clock domain. The different aspects of the calculation could occur in different domains as well. It should also be noted that the counters do not need to start at zero (i.e. be reset), but rather an error injection could cause the transmitter counter value to be recorded and an error detection causes the receiver count value to be recorded. Further, while two counters are shown by way of example, a single counter could be implemented.

Figure 8:
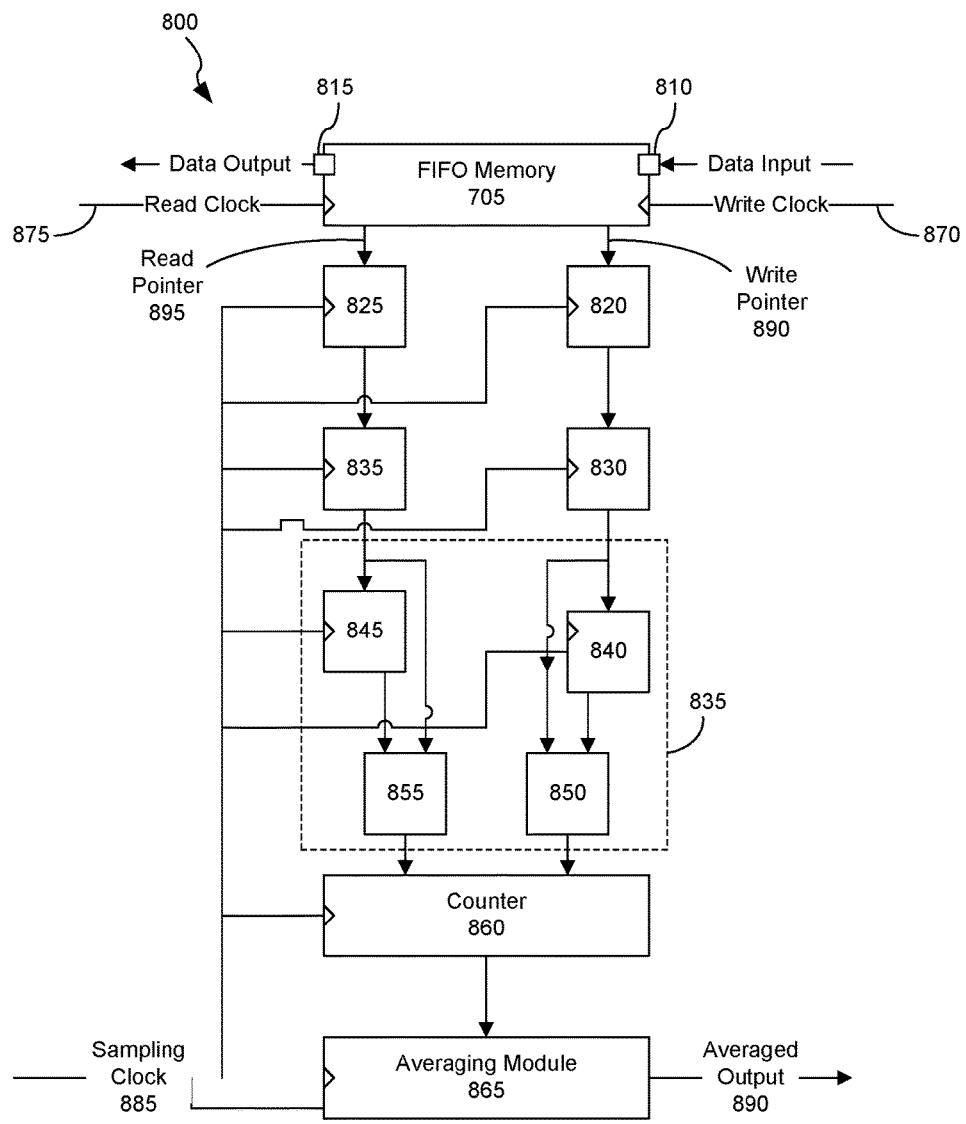
FIG. 8 is a block diagram showing a system for determining transit time across an asynchronous, first-in-first-out-memory.
Figure 9:
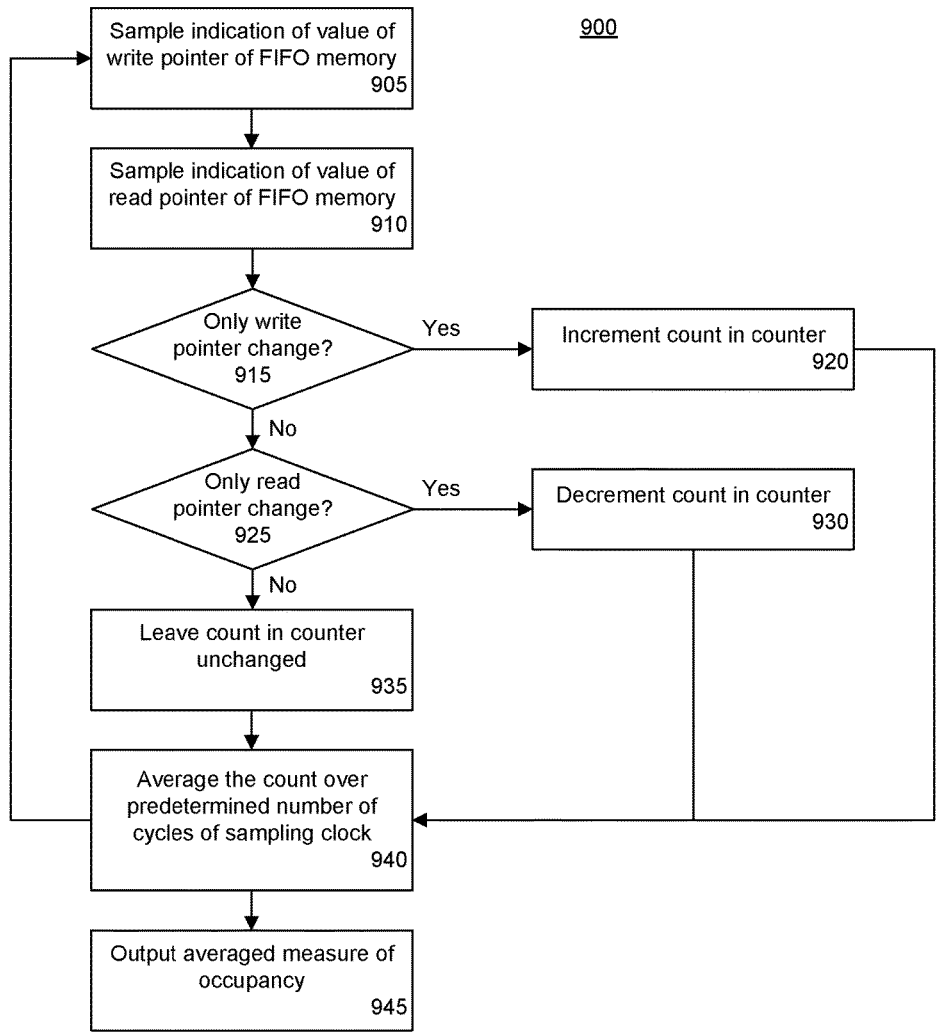
FIG. 9 is a flow chart showing a method of determining transit time across an asynchronous, FIFO memory.

Turning now to FIG. 8, a block diagram illustrates a system for determining transit time across an asynchronous, first-in-first-out-memory in accordance with one embodiment of the present invention. The block diagrams of FIGS. 8 and 9 are described in more detail in reference to Edwards et al., U.S. Pat. No. 7,594,048, the entire patent of which is incorporated by reference. A FIFO memory 805 can include an input data port 810 and an output data port 815. The FIFO memory 805 further can be coupled to a write clock 870 operating at a write frequency as well as a read clock 875 operating at a read frequency. The write clock 870 can control operation of the write pointer 890 of the FIFO memory 805 and the read clock 875 can control operation of the read clock pointer 795 of the FIFO memory 805.

As known, the write pointer 890 can be incremented on each cycle of the write clock 870. The write pointer 890 can store an address or value indicating a location within the FIFO memory 605 to which data is to be written. The read pointer 895 can be incremented on each cycle of the read clock 875. The read pointer 895 can store an address or value indicating a location within the FIFO memory 805 to which data is to be written. The write pointer 890 and the read pointer 895 can be incremented until such time that each cycles around to the beginning of the FIFO memory 805.

The FIFO memory 805 can function as an interface between two different clock domains. For example, the FIFO memory 805 may be included within a communication system, where the write clock 870 of the FIFO memory 805 and the read clock 875 of the FIFO memory 805 typically operate at the same frequency, but are not derived from the same clock source.

Often, the read clock 875 is generated onboard or local to the FIFO memory 805, while the write clock 870 is recovered from an incoming data stream. Accordingly, the read clock 875 and the write clock 870 typically are not phase related. Further, the frequency of the read clock 875 and the write clock 870 will drift against one another as the communication system continues to operate. Due to the continual drift, the delay of the FIFO memory 805, e.g., the transit time, must be continually measured as the communication system including the FIFO memory 805 operates.

In one embodiment, the system 800 can include a first stage of registers including registers 820 and 825. An indication of the value of the write pointer 890 (hereafter "write pointer") can be written from the FIFO memory 805 to register 820. An indication of the value of the read pointer 895 (hereafter "read pointer") can be written from the FIFO memory 805 to register 825. Both registers 820 and 825 can be clocked according to a sampling clock 885 operating at a given frequency, e.g., the "sampling frequency."

The sampling frequency of the sampling clock 885 can be independent of the frequency of the write clock 870 and the read clock 875 of the FIFO memory 805. The sampling frequency need not be derived from the write clock 870 or the read clock 875. In one embodiment, the sampling frequency need only be higher than the frequency of the write clock 870 of the FIFO memory 805 and higher than the frequency of the read clock 875 of the FIFO memory 805.

In another embodiment, due to various effects upon the write clock 870 and the read clock 875, e.g., jitter and other uncertainties, the sampling frequency can be set high enough so that at least one period of the sampling clock 885 occurs between consecutive cycles of the write clock 870 and consecutive cycles of the read clock 875. The sampling frequency should be set high enough so that two transitions of the write clock 870 or the read clock 675 do not occur without a sample of the write pointer 890 and the read pointer 895 being taken, e.g., loaded into registers 820 and 825 respectively. In one embodiment, the sampling frequency can be set to a value that is approximately 10%, or more, higher than each of the write clock 870 and the read clock 875.

It should be appreciated that specific percentages have been proposed herein for purposes of illustration only and not to suggest or limit the embodiments to any one particular percentage or sampling frequency. The sampling frequency may be any other percentage higher than the write clock 870 and the read clock 875 so long as the constraints described herein are observed.

In another embodiment, system 800 can include a second stage of registers including registers 830 and 835. Each of registers 830 and 835 also can be driven or clocked by the sampling clock 885. The write pointer 890 can be propagated from register 820 to register 830 on successive cycles of the sampling clock 885. The read pointer 695 can be propagated from register 825 to register 835 on successive cycles of the sampling clock 885. Taken collectively, the first stage and the second stage of registers 820-835 double-register the write pointer 890 and the read pointer 895. Double registering can reduce the probability of an indeterminate state being registered and propagated through system 800, thereby increasing the overall stability of system 800.

System 800 further can include a comparator module 835. The comparator module 835 can include registers 840 and 845 as well as comparators 850 and 855. The write pointer 890 can be propagated from register 830 to register 840. Register 840 can serve as a delay that delays the write register 890 by one cycle of the sampling clock 885. Comparator 650 can receive the write pointer 890 from register 830 and a delayed version of the write pointer 890 from register 840. Comparator 850 can compare the write pointer 890 with the delayed write pointer 890 to determine whether a change in the write pointer 890 has occurred.

Similarly, the read pointer 895 can be propagated from register 835 to register 845. Register 845 can function as a delay, which delays the read pointer 895 by one cycle of the sampling clock 885. Comparator 855 can receive the read pointer 895 from register 835 and a delayed version of the read pointer 895 from register 845. Comparator 855 can compare the read pointer 895 with the delayed read pointer 895 to determine whether a change in the read pointer 895 has occurred.

Each of comparators 850 and 855 can provide an output to counter 860. Comparator 850 can output a signal to counter 860 that indicates when the write pointer 890 changes or has changed. Comparator 855 can output a signal to counter 860 that indicates when the read pointer 695 changes or has changed.

Counter 860, also driven by the sampling clock 885, can receive the output from each of comparators 850 and 855. Counter 860 can store a count value (count). The counter 860 can be configured to increment the count when only the write pointer 890 changes as indicated by the signal output from comparator 850. Counter 860 can be configured to decrement the count when only the read pointer 895 changes as indicated by the signal output from comparator 855. When both the write pointer 890 and the read pointer 695 change, the counter 860 can be configured leave the count unchanged, e.g., not increment the count. Similarly, when neither the write pointer 690 nor the read pointer 895 change, the counter 860 can be configured to leave the count unchanged.

An averaging module a can be coupled to the counter 860 and clocked by the sampling clock 885. The count stored within the counter 660 can be provided to the averaging module 865 each cycle of the sampling clock 885. The averaging module 865, being clocked by the sampling clock 885, can average the count over a predetermined number of cycles of the sampling clock 885. The averaging module 885 can output the averaged count 880. The averaged count 880, e.g., the average occupancy of the FIFO memory 805, indicates the transit time of the FIFO module 805. For example, the average occupancy, as measured in read/write clock cycles of the FIFO memory 805, can be multiplied by the nominal period of the read/write clock to indicate transit time. As used herein, "outputting" can include, but is not limited to, writing to a file, writing to a user display or other output device, playing audible notifications, sending or transmitting to another system, exporting, or the like.

In one embodiment, the indication of the value of the write pointer 890 and the indication of the value of the read pointer 895 that is passed to registers 820 and 825 respectively can be the actual value of each respective pointer. The value of the write pointer 890 can be passed to register 820 and the value of the read pointer 895 can be passed to register 8825. Both the value of the write pointer 890 and the value of the read pointer 895 can be specified using gray code. The use of gray code results in only a single bit changing when the write pointer 890 and/or the read pointer 895 is incremented, thereby reducing the uncertainty in system 800.

In another embodiment, the value of the write pointer 890 and the value of the read pointer 895 can be specified in binary format. In that case, rather than propagating the entire value of the write pointer 690 and the entire value of the read pointer 895, only the least significant bit of each pointer need be obtained, e.g., sampled, and propagated. Accordingly, the least significant bit of the write pointer 890 can be loaded into register 820 and propagated. Similarly, only the least significant bit of the read pointer 695 can be loaded into register 825 and propagated. This embodiment further provides benefits similar to those attained using gray code where only a single bit changes when the state of either pointer changes.

The embodiment in which the entire write pointer 890 value and the entire read pointer 895 value are propagated will require a greater bit width than the case in which only the least significant bit is sampled. Thus, more registers at each respective stage of system 800 up to the counter 860 will be needed and depend upon the width of the pointers, e.g., one register for each bit. The embodiment in which only the least significant bit of each pointer is propagated reduces the bit width of each stage to a single bit for each pointer and, thus, the size of system 800.

FIG. 9 is a flow chart illustrating a method 900 of determining transit time across an asynchronous, FIFO memory in accordance with another embodiment of the present invention. The method 900 can be performed using a system such as the system described with reference to FIG. 8. The method 900 can begin in step 905 where an indication of the value of the write pointer of the FIFO memory can be sampled. In step 910, an indication of the value of the read pointer of the FIFO memory can be sampled.

As noted, in one embodiment, the indication of the value of the write pointer and the read pointer can be the actual value of each respective pointer specified using gray code format. In another embodiment, the indication of the value of the write pointer and the read pointer can be the least significant bit of each respective pointer specified in binary format. Both the write pointer and the read pointer can be sampled via double registering at a specified sampling frequency. At each cycle of the sampling frequency, another sample pair, including a sample of the write pointer and a sample of the read pointer, can be taken and propagated through to the comparator module.

Beginning in step 915, a measure of fractional occupancy of the FIFO memory can be calculated. A count in a counter can be incremented, decremented, or left unchanged according to whether the write pointer and/or read pointer changes from one sampling cycle to the next. As the sample clock operates at a frequency that exceeds both the write clock and the read clock of the FIFO memory, the count, which reflects the occupancy of the FIFO memory, can be said to be fractional.

In step 915, a determination can be made as to whether only the write pointer changed with respect to a current sample pair of the write pointer and the read pointer. If so, the method can continue to step 920 where the count in the counter can be incremented. If not, the method can proceed to step 925. In step 925, a determination can be made as to whether only the read pointer changed with respect to a current sample pair of the write pointer and the read pointer. If so, the method can proceed to step 930 where the count in the counter can be decremented. If not, the method can continue to step 935. In step 935, the count in the counter can be left unchanged as either both the write pointer and the read pointer changed or neither the write pointer nor the read pointer changed.

In step 940, the count in the counter can be averaged with one or more prior count values. The count can be averaged over a selected number of cycles of the sampling frequency. The averaged count can be output in step 945. It should be appreciated that as the averaged count is output, the method further can loop back to step 905 to continue sampling further indications of the write and read pointer values of the FIFO memory.

Figure 10:
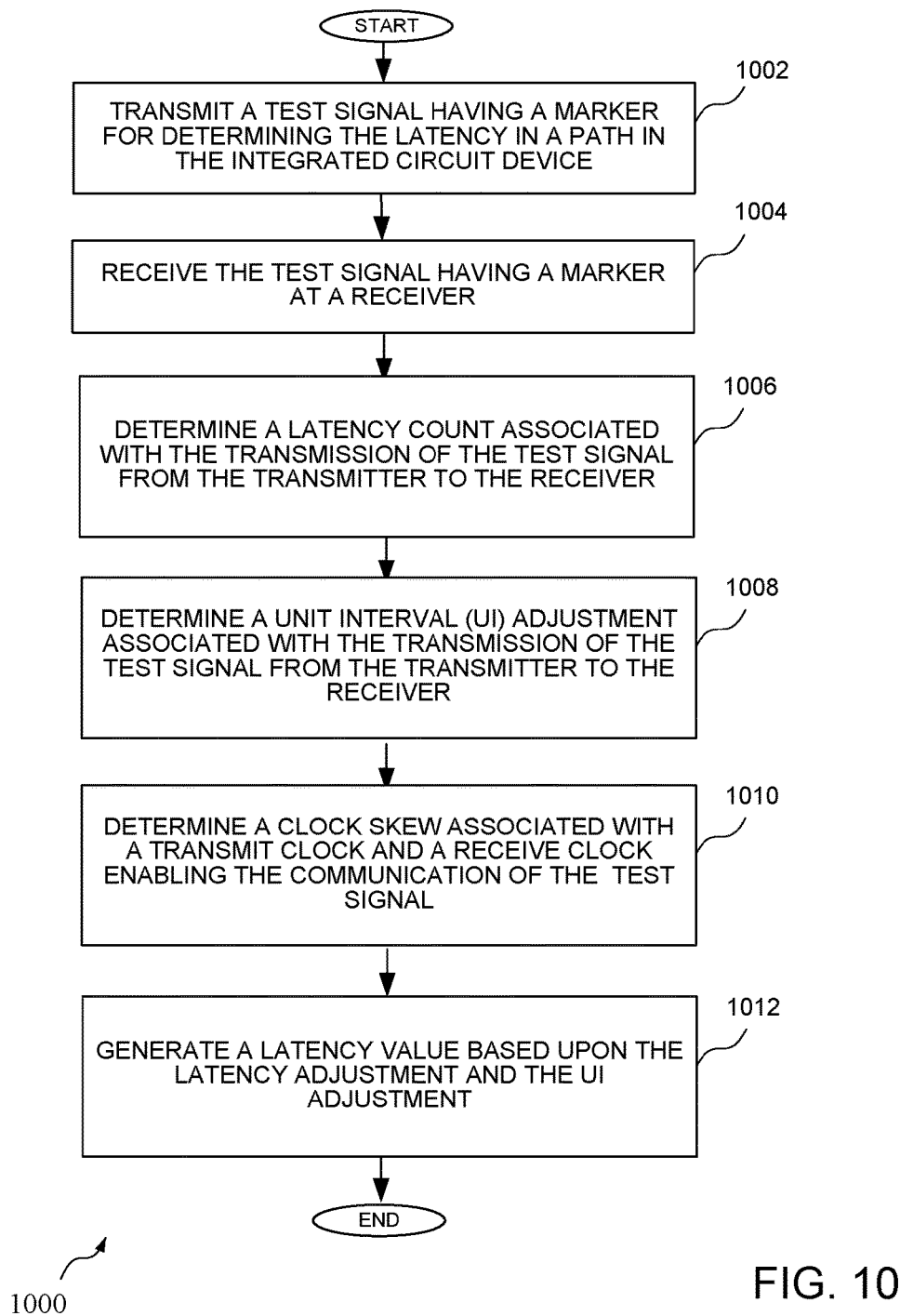
FIG. 10 is a flow chart showing a method of measuring latency in an integrated circuit.

Turning now to FIG. 10, a flow chart shows a method of measuring latency in an integrated circuit. The method of measuring latency in an integrated circuit device comprises transmitting a test signal having a marker for determining the latency in a path in the integrated circuit device at a block 1002. The test signal having a marker is received at a receiver at a block 1004. A latency count associated with the transmission of the test signal from the transmitter to the receiver is determined at a block 1006, and a unit interval (UI) adjustment associated with the transmission of the test signal from the transmitter to the receiver is determined at a block 1008. A clock skew between a transmitter clock and a receiver clock may be determined at a block 1010. A latency value based upon the latency count and one or both of the UI adjustment and the clock skew is then generated at a block 1012. That is, as described above, a more accurate calculation of latency could be made by adjusting a coarse latency calculation with a latency adjustment, which may be a fraction of a UI, or a clock slew, or both the latency adjustment and the clock skew.

According to some implementations, the test signal from the transmitter to the receiver may be routed within the integrated circuit device, or by way of a transmission line external to the integrated circuit device. The method may further comprise injecting an error representing the marker into a generated signal, wherein the test signal comprises generating a pseudorandom binary sequence (PRBS) signal. A clock skew measurement associated with a transmitter clock and a receiver clock may be determined, where a latency value may be based upon the latency count, the UI adjustment and the clock skew measurement.

It can therefore be appreciated that new circuits for and methods of measuring the latency in an integrated circuit have been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A circuit for measuring latency in an integrated circuit device, the circuit comprising:
    a transmitter circuit having signal generator configured to generate a test signal having a marker for determining a latency in a path associated with the integrated circuit device; and
    a latency calculation circuit coupled to the signal generator and having a latency adjustment circuit and a unit interval (UI) adjustment circuit;

wherein the latency calculation circuit generates a latency value based upon a latency count from the latency adjustment circuit and a UI adjustment from the UI adjustment circuit.

2. The circuit of claim 1 further comprising a transmission line coupled between the transmitter circuit and the latency calculation circuit, wherein the transmission line is within the integrated circuit device.

3. The circuit of claim 1 further comprising a transmission line coupled between the transmitter circuit and the latency calculation circuit, wherein the transmission line is external to the integrated circuit device.

4. The circuit of claim 1 wherein transmitter circuit further comprises an injector circuit configured to inject the marker representing the marker of the test signal.

5. The circuit of claim 1 wherein the signal generator comprises a pseudorandom binary sequence (PRBS) generator.

6. The circuit of claim 1 wherein further comprising a transmitter counter coupled to receive a start signal from the signal generator and a receiver counter coupled to receive a stop signal.

7. The circuit of claim 1 further comprising a skew measurement circuit configured to generate a clock skew value that compensates for the clock skew between a transmitter clock and a receiver clock.

8. A circuit for measuring latency in an integrated circuit device, the circuit comprising:
a transmitter circuit having signal generator configured to generate a test signal having a marker for determining a latency in a path associated with the integrated circuit device; and
a latency calculation circuit coupled to the signal generator and having a latency adjustment circuit and a skew measurement circuit;
wherein the latency calculation circuit generates a latency value based upon a latency count from the latency adjustment circuit and a clock skew from the skew measurement circuit.

9. The circuit of claim 8 further comprising a transmission line coupled between the transmitter circuit and the latency calculation circuit, wherein the transmission line is within the integrated circuit device.

10. The circuit of claim 8 further comprising a transmission line coupled between the transmitter circuit and the latency calculation circuit, wherein the transmission line is external to the integrated circuit device.

11. The circuit of claim 8 wherein transmitter circuit further comprises an injector circuit configured to inject a marker representing the marker of the test signal.

12. The circuit of claim 8 wherein the signal generator comprises a pseudorandom binary sequence (PRBS) generator.

13. The circuit of claim 8 wherein further comprising a transmitter counter coupled to receive a start signal from the signal generator and a receiver counter coupled to receive a stop signal.

14. The circuit of claim 8 further comprising an adder circuit configured to receive the latency count and the clock skew.

15. A method of measuring latency in an integrated circuit device, the method comprising:
transmitting a test signal having a marker for determining the latency in a path in the integrated circuit device;
receiving the test signal having a marker at a latency calculation circuit;
determining a latency count associated with the transmission of the test signal from a transmitter circuit to the latency calculation circuit as a course latency value;
determining a fine adjustment associated with the transmission of the test signal from the transmitter circuit to the latency calculation circuit; and
generating a latency value based upon the latency adjustment and the fine adjustment.

16. The method of claim 15 further comprising routing the test signal from the transmitter circuit to the latency calculation circuit within the integrated circuit device.

17. The method of claim 15 further comprising routing the test signal from the transmitter circuit to the latency calculation circuit by way of a transmission line external to the integrated circuit device.

18. The method of claim 15 further comprising injecting a marker representing the marker into a generated signal.

19. The method of claim 15 wherein transmitting a test signal comprises generating a pseudorandom binary sequence (PRBS) signal.

20. The method of claim 15 wherein the fine adjustment comprises at least one of a unit interval (UI) adjustment and a clock skew.

* * * * *